United States Patent [19]
Berglund

[11] 3,871,131
[45] Mar. 18, 1975

[54] SELF-WATERING PLANT POTS OR RECEPTACLES

[75] Inventor: Jan Berglund, Mullsjo, Sweden

[73] Assignee: AB Husqvarna Borstfabrik, Husqvarna, Sweden

[22] Filed: Dec. 26, 1973

[21] Appl. No.: 427,859

[30] Foreign Application Priority Data
Jan. 4, 1973    Sweden............................ 73001059

[52] U.S. Cl.................... 47/38.1, 239/145, 222/187
[51] Int. Cl............................................. A01g 27/00
[58] Field of Search ............ 47/38, 38.1, 38.10, 1.2; 239/145; 222/187

[56] References Cited
UNITED STATES PATENTS

| | | | |
|---|---|---|---|
| 399,277 | 3/1889 | Mueller............................ | 47/38.1 X |
| 1,108,334 | 8/1914 | Carr.................................. | 47/38.1 |
| 1,298,182 | 3/1919 | De Witt........................... | 47/38.1 X |
| 2,172,514 | 9/1939 | Lockyer............................ | 47/38.1 |
| 2,205,303 | 6/1940 | Munsell............................ | 47/1.2 |
| 2,747,332 | 5/1956 | Morehouse...................... | 47/38.1 |
| 3,018,586 | 1/1962 | Farley............................... | 47/38.1 X |

FOREIGN PATENTS OR APPLICATIONS

| | | | |
|---|---|---|---|
| 1,098,067 | 1/1968 | Great Britain..................... | 47/38.10 |
| 221,845 | 9/1967 | Sweden.............................. | 47/38.1 |
| 1,542,761 | 10/1968 | France............................... | 47/38.1 |
| 466,630 | 1/1969 | Switzerland....................... | 47/38.1 |
| 1,393,533 | 2/1965 | France............................... | 47/38.1 |
| 1,058,780 | 3/1957 | Germany........................... | 47/38.1 |

*Primary Examiner*—Edgar S. Burr
*Assistant Examiner*—E. H. Eickholt
*Attorney, Agent, or Firm*—Hubbell, Cohen & Stiefel

[57] ABSTRACT

A self-watering plant pot or receptacle comprises a reservoir for water or the like and a container for soil or the like and plants therein, which is located substantially entirely above the water surface. At least one tube extends through the soil in direct engagement therewith and has its lower end projecting into the reservoir for the supply of water to the reservoir. A liquid absorbent and transporting hose or sock, which may be comprised of textile or synthetic fibre material, is drawn upon the outside of the liquid supply tube for transferring water from the reservoir to the soil in the container.

6 Claims, 2 Drawing Figures

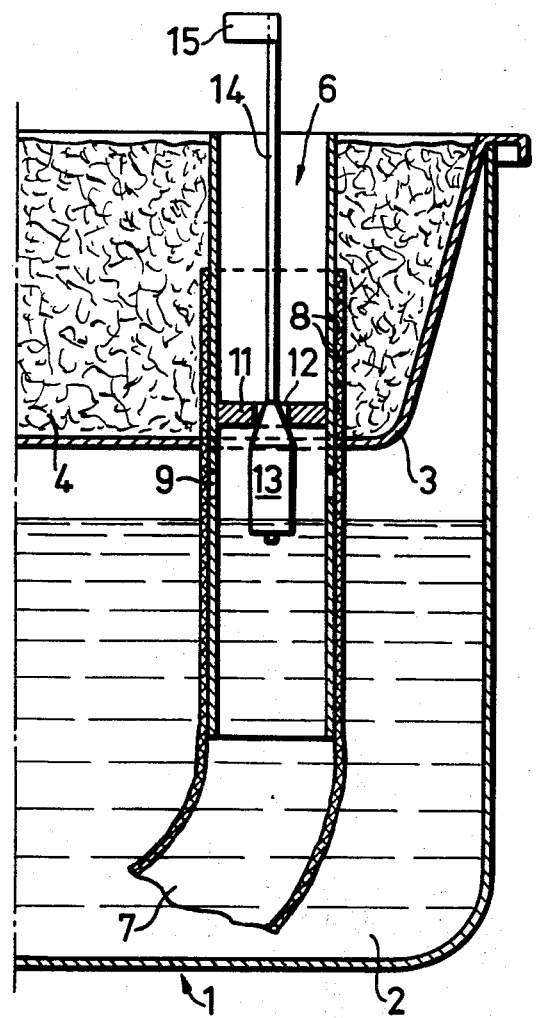
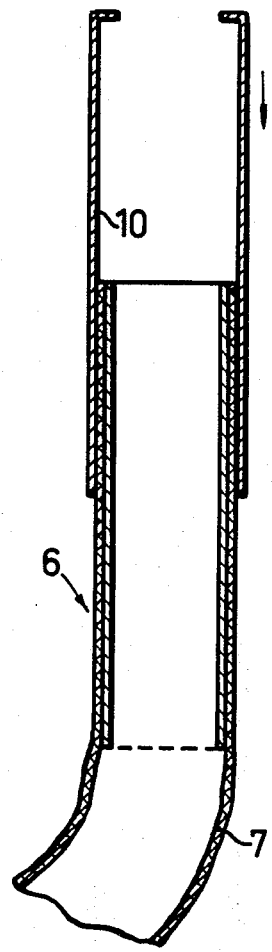

SELF-WATERING PLANT POTS OR RECEPTACLES

This invention relates to improvements in so called self-watering plant pots or receptacles, which comprise a reservoir for water or the like, a container for soil or the like and plants therein located substantially entirely above the water surface, at least one tube which extends through the soil in direct engagement therewith and has its lower end projecting down into the reservoir and which is provided on the one hand for the supply of liquid to the reservoir and on the other hand for transferring liquid from the reservoir to the soil in the container.

Apparatus of this kind are previously known in many different forms. The fundamental features of such apparatus vary in dependence of the intended use of the apparatus, i.e. if it is intended for small plant pots for domestic use or for big flower receptacles or pots for parks and other open places, office landscapes or the like.

This invention relates primarily to a device of the last-mentioned type, and the general object of the invention is to provide a simplified means of this kind which can easily be adjusted with respect to the amount of liquid (water) supplied to the plants by the watering device. This object is attained by the device according to the invention thanks to the fact that a liquid absorbent and transporting hose or sock, which preferably is comprised of textile or synthetic fibre material, is drawn upon the outside of the liquid supply and liquid transferring tube.

Further features and advantages of the apparatus according to the invention will become apparent from the following detailed description and the annexed drawing which as a non-limiting example illustrates a preferred embodiment of the invention and in which:

FIG. 1 is a vertical partial sectional view through a plant receptacle provided with the apparatus according to the invention; and FIG. 2 is a diagrammatical partial view illustrating a modified embodiment, also in vertical section.

In FIG. 1 the reference numeral 1 designates a plant pot or receptacle, preferably having comparatively large dimensions, 2 designates water or a water-like nutrient solution, 3 is an insert member which in the illustrated embodiment rests upon the upper edge of the receptacle and contains soil or the like 4, including plants therein (not shown). For the supply of liquid to the reservoir portion of the receptacle 1 there is provided a water supply tube which is generally designated 6 and extends through the soil 4 with its outer circumferential surface in engagement therewith.

According to the invention the water supply tube 6 is adapted simultaneously to constitute a liquid conveyor which by capillary action transfers liquid 2 from the reservoir portion of the receptacle 1 to the soil 4. With this object in view the tube 6 has a surface layer which is porous, liquid absorbent, capillary active or liquid absorbing and transporting in another way. According to the invention the surface layer is comprised of a hose or sock 7 of nylon fabric or the like, the upper end of which extends more or less high up in the soil 4 and the lower free end of which projects downwardly of the lowerr end of the tube 6. The amount of liquid transferred from the reservoir portion of the receptacle 1 to the soil 4 by the sock 7 is dependent upon the contact surface between the sock 7 and the soil 4 and may be adjusted by pushing or pulling the sock upwardly or downwardly on the tube 6. To facilitate the level adjustment of the sock 7 with respect to the liquid absorption requirements of the plants in the pot, the upper end of the tube 6 may, according to a further development of the invention, be provided with calibrations or a scale 8, which cooperates with the upper edge of, or with an index on, the sock, and which is graduated in plant sort and/or number of flowers.

To promote the absorption of liquid by the sock 7 after that the sock and the reservoir portion of the receptacle 1 have become dry, the tube 6 is suitably provided with one or more apertures 9 through which the sock is wetted at a comparatively high level when liquid is supplied to the tube 6.

The tube 6 may be provided with an internal flange 11 which has a central opening constituting a valve seat for a float 13 which operates as a shut off valve and the upper, preferably bevelled end of which seals against the opening 12 from below and thereby prevents overfilling of the reservoir portion of receptacle 1.

The float 13 may suitably be provided with a rod 14, which projects a considerable distance above the upper end of the tube 6 when there is a sufficient amount of water in the reservoir portion of the receptacle 1 and which carries a signal flag or another indicating means 15 which comes to rest upon the upper end of the tube 6 when the liquid level in the reservoir portion of the receptacle 1 and thus also the float 13 has descended below the refill limit.

FIG. 2 in which same reference numerals as in FIG. 1 have been utilized to designate the same or similar members illustrates diagrammatically and in a longitudinal section a supplement to the structure described above. Thus, FIG. 2 shows in a simplified way a supply tube 6 which is provided with a suction sock 7 in accordance with the above. According to FIG. 2 the size of the liquid transferring, soil-engaging surface of the tube 6 is controlled by a tight, displaceable sleeve 10, which possibly may be slotted and which is slipped on to the outside of the tube 6 and the illustrated suction sock 7.

The embodiments described above and illustrated in the drawings are, of course, to be regarded merely as non-limiting examples and may as to their details be modified in several ways within the scope of the following claims. Thus, the plant receptacle may, at least if it is of a larger size, contain several supply tubes, of which at least one is made according to the invention.

What I claim is:

1. In a so called self-watering plant pot or receptacle, a reservoir for a nutrient liquid, such as water, a container for soil and plants therein which is located substantially entirely above the liquid surface in the reservoir, at least one tube which extends through the soil in direct engagement therewith and has its lower end projecting down into the reservoir for the supply of liquid to the reservoir and a liquid absorbent and transporting hose or sock, which is drawn upon the outside of the liquid supply tube for transferring liquid from the reservoir to the soil in the container.

2. Improvements in so called self-watering plant pots or receptacles according to claim 1, in which the sock is displaceable with respect to the tube for adjustment of the contact surface between the sock and the plant soil.

3. Improvements in so called self-watering plant pots or receptacles according to claim 1, in which the tube is provided with calibrations, such as a scale, which are adapted to cooperate with an index on the sock to facilitate its level adjustment with respect to the liquid absorption requirements of the plants in the pot.

4. Improvements in so called self-watering plant pots or receptacles according to claim 1, in which the wall of the tube is provided with through apertures for wetting the sock at the supply of liquid to the reservoir.

5. Improvements in so called self-watering plant pots or receptacles according to claim 1 comprising a tight, isolating sleeve which is slipped on to the sock for adjustment of the contact surface between the sock and the plant soil.

6. Improvements in so called self-watering plant pots or receptacles according to claim 1, in which the hose or sock is of textile or synthetic fibre material.

* * * * *